N. E. MACCALLUM.
FURNACE WALL CONSTRUCTION.
APPLICATION FILED MAY 13, 1913.
1,106,725.
Patented Aug. 11, 1914.
2 SHEETS—SHEET 1.
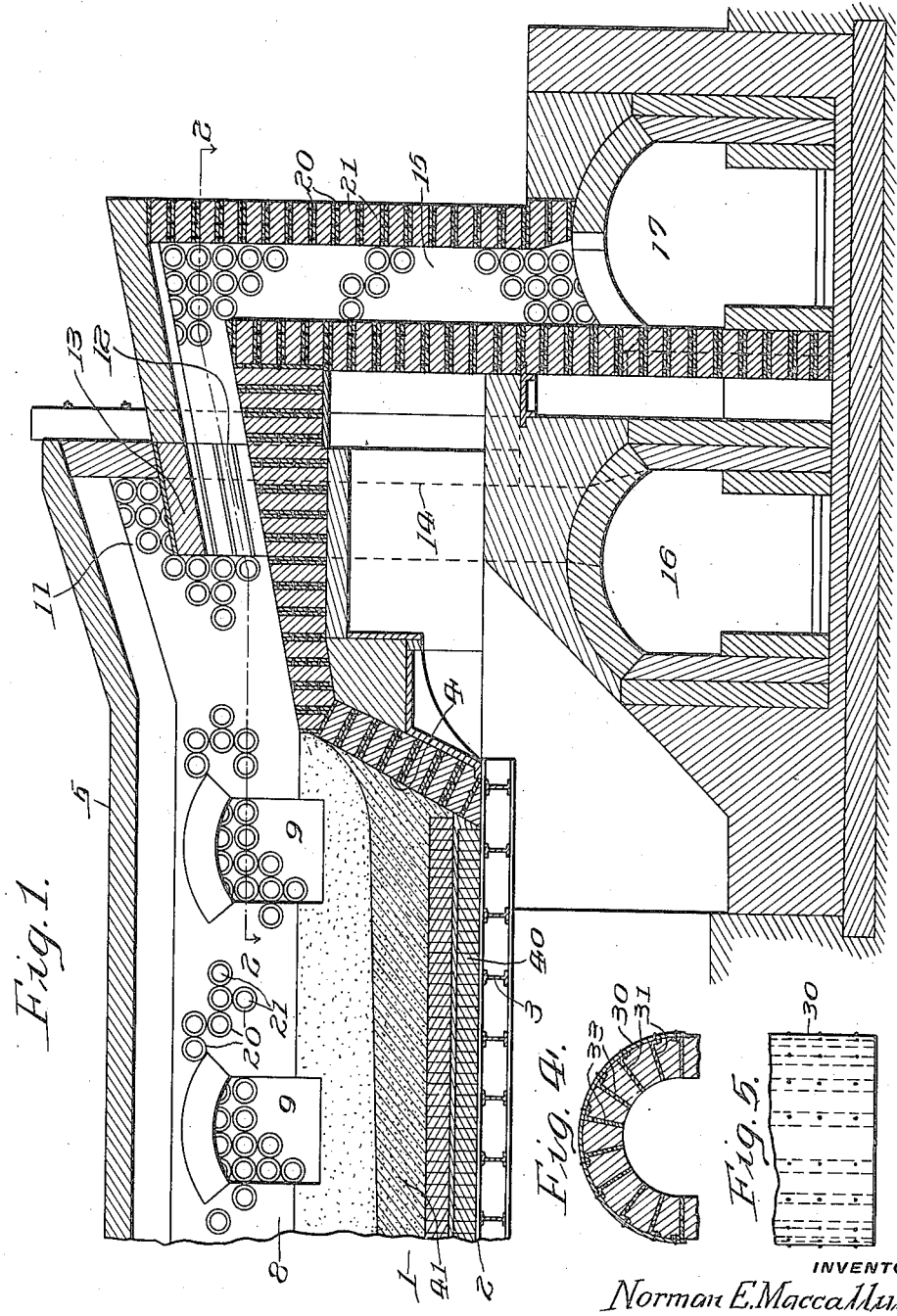
INVENTOR
Norman E. Maccallum.
WITNESSES
BY
ATTORNEY N. E. MACCALLUM.
FURNACE WALL CONSTRUCTION.
APPLICATION FILED MAY 13, 1913.
1,106,725.
Patented Aug. 11, 1914.
2 SHEETS—SHEET 2.
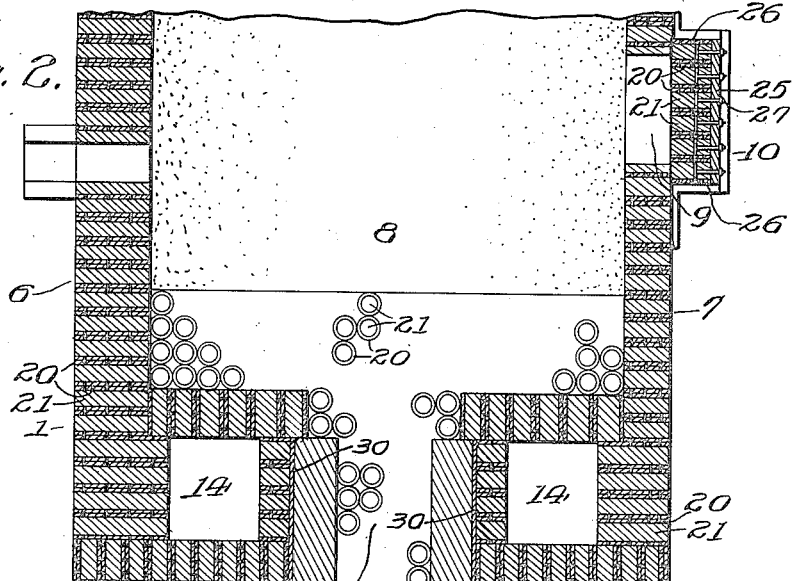
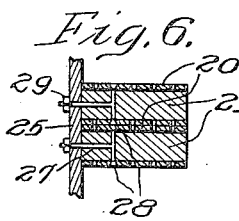
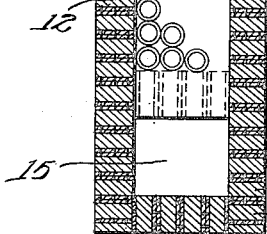
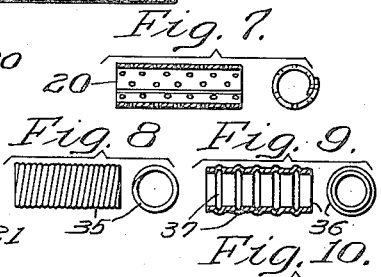
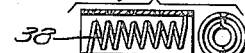
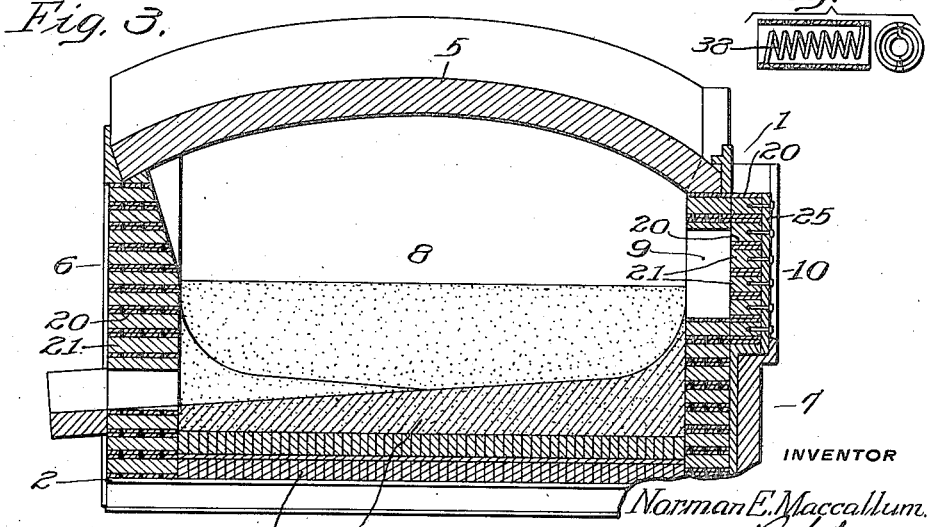
INVENTOR
Norman E. Maccallum.
WITNESSES
BY
ATTORNEY

UNITED STATES PATENT OFFICE.

NORMAN E. MACCALLUM, OF PHOENIXVILLE, PENNSYLVANIA.

FURNACE-WALL CONSTRUCTION.

1,106,725.　　　　Specification of Letters Patent.　　Patented Aug. 11, 1914.

Application filed May 13, 1913. Serial No. 767,305.

*To all whom it may concern:*

Be it known that I, NORMAN E. MACCALLUM, a citizen of the United States, and a resident of Phoenixville, county of Chester, State of Pennsylvania, have invented certain new and useful Improvements in Furnace-Wall Construction, of which the following is a specification.

Heretofore in the construction of steel furnaces, the upper part or roof of each furnace, or at least the inner exposed portion of the roof, has been almost invariably made of silica brick, while the bottom, or hearth, or basin of the furnace has been made of an acid material, or of a basic material, depending upon whether the furnace was to be operated by the acid process, or by the basic process. About the only acid material which has been found to be satisfactory for this purpose is silica sand, and while various basic materials such as lime, dolomite and other basic materials have been used in this connection, it has been heretofore generally considered that magnesite (or magnesium carbonate) was the best material for basic open hearth bottoms, and just prior to the present invention, practically all basic open hearth steel furnaces have been provided ordinarily with bottoms lined interiorly with magnesite brick and the inner surfaces of the magnesite brick have been covered with several layers of magnesite to form the hearth. The use of silica brick and magnesite brick in the construction of open hearth and other steel furnaces has been so general that at the present time several large plants are required to supply the demand for these two kinds of brick.

Although prior to this invention silica brick has been considered the best material available for the purposes noted, it has not been altogether satisfactory as, when in use in a steel furnace, it gradually wears or burns away under the action of the chemical and mechanical influences to which it is necessarily subjected, and furthermore, the silica brick under the action of the intense heat of the furnace, gradually melts and fuses with the iron oxid which is formed during the operation of the furnace, forming a fusible silicate of iron or slag, which runs down upon and injures the hearth, when the hearth is made of magnesite brick covered with magnesite, as above described. Hitherto attempts have been made to substitute magnesite brick for silica brick in the upper and exposed portions of open hearth furnaces, but the magnesite brick is friable, crumbles and wears away, and is no improvement over the silica brick. Furthermore, magnesite brick is about five times as expensive as silica brick, thus making its use prohibitive in view of the fact that it has no practical advantage over the silica brick. The magnesite brick, however, form a moderately satisfactory base for the hearth as, when used for this purpose, the brick are shielded as hereinbefore described by the superimposed layers of magnesite from the direct action of the flame in the furnace and do not wear away or deteriorate as long as the covering formed by the layers of magnesite is maintained, this covering being kept in condition by being patched or repaired as necessary after every heat.

In the operation of a furnace in which the roof, side and end walls, or other portions of the furnace are formed of silica brick, the brick wears or burns away to such an extent as to require the furnace to be shut down frequently for repairs, or for the replacement of the entire roof and upper portion, thus causing corresponding losses in the tonnage or output of the furnace, and consequently decreasing the efficiency of the furnace and increasing the cost of the steel produced.

Various efforts have been made and various expedients have been and are being used to prevent or to minimize the wearing and burning away of the exposed walls of steel furnaces. For instance, to prevent the rapid burning away of the walls which separate the air and gas ports of the steel furnace, and which are subjected to very intense heat, it is a common practice to cool these walls artificially by the use of water jackets or water pipes arranged in contact with these walls and through which a constant circulation of water is maintained. And it has been suggested that water pipes may be embedded in the roof of a steel furnace for a like purpose. But the use of water jackets or pipes in this manner, particularly when used to cool the roof of the furnace, tends to lower the temperature of the furnace, and to reduce its efficiency, and is otherwise objectionable. To minimize the losses which result from the wearing away of silica brick, the roof of the furnace is usually made much thicker than would otherwise be necessary, thus increasing the initial cost of the furnace over what would be the cost if the roof were formed of a material which would not be thus reduced in thickness by the action of the furnace.

One object of this invention is to overcome the disadvantages hereinbefore noted, which are inherent in steel furnaces as heretofore constructed.

More specifically stated one object of this invention is to provide an improved construction which is particularly adapted to be utilized in a steel furnace in forming the roof, the hearth, the side and end walls or linings, the walls or arches that separate the air and gas ports, and any other wall or portion thereof, and which is adapted to maintain substantially its original form and efficiency for practically unlimited periods of service in positions exposed to the chemical reactions and extremely high temperatures and other physical forces of the interior of the furnace.

This invention in one of its applied forms in a steel furnace comprises, briefly, a wall including a plurality of containers, each of which is filled with a solid core of any suitable material or mixture or combination of materials, the containers being preferably arranged in close order and held together by any suitable binder or other means, and preferably having open ends or openings facing inwardly and in which the cores are exposed to form portions of the internal surface of the wall as will be described hereinafter.

In the accompanying drawings, Figure 1 is a fragmentary longitudinal section of an open hearth steel furnace constructed in accordance with this invention; Fig. 2 a fragmentary horizontal section of the same; Fig. 3 a fragmentary vertical transverse section of the same; Figs. 4 and 5 are a fragmentary transverse vertical section and a fragmentary top plan view respectively of a portion of the same; Fig. 6 is an enlarged fragmentary sectional view of a portion of the same; Fig. 7 shows a longitudinal section and an end elevation respectively of a detail of the same; and Figs. 8 to 10 show longitudinal sections and end elevations of three modified forms of containers constructed in accordance with this invention.

Referring to the drawings, one embodiment of this invention comprises a steel furnace, which in the main is of the usual form providing an oblong bottom or hearth 1, which is supported upon a flat horizontal steel plate 2 mounted upon I beams 3 resting upon suitable supports (not shown). The hearth 1 has upwardly diverging end walls 4 and is arched over by a roof 5. Side walls or "linings" 6 and 7 connect the roof 5 and the hearth 1, and form therewith a combustion chamber 8, the side walls 6 and 7 being provided with the usual openings 9 covered by movable doors 10. The combustion chamber 8 is provided at each end with the usual air port 11 and gas port 12 divided by a bridge or arch 13, the air and gas ports being connected by suitable conduits 14 and 15 to corresponding air and gas regenerators 16 and 17 respectively, (only one of which is shown).

In this improved construction, instead of forming the side walls 6 and 7 of the combustion chamber 8 of silica brick, as has been the general practice heretofore, these walls are preferably constructed, in accordance with this invention, of a plurality of elements, or units, each of which comprises a suitable container 20 filled with a suitable core 21. These containers are preferably made of iron or steel and may be of any suitable shape, being conveniently and cheaply made of substantially cylindrical form by bending flat rectangular sheets of iron or steel, and overlapping their edges as shown in Fig. 7, or by cutting an iron or steel pipe into sections of suitable length, using either a "seamless" pipe or a pipe having a welded seam for this purpose. When a substantially cylindrical container is used, it has been found that good results may be obtained by having the wall of the container only about $\frac{1}{32}$ of an inch in thickness and by having the container about two inches in diameter. These containers 20 may be filled with cores 21 of any suitable material, but preferably with cores composed of a basic material or a mixture of a basic material and a neutral material. Some of the basic materials which may be utilized in this connection are magnesite (magnesium carbonate), dolomite (a magnesian limestone) and lime (calcium carbonate), magnesite being preferred. Among the neutral materials useful in this connection are chromite (usually termed chrome ore), bauxite (hydroxid of aluminum) and carbon, chromite being preferred. In forming the cores from the materials above noted, the magnesite or other basic material is preferably first calcined to reduce it to an oxid and when chromite or other neutral material is to be mixed with the basic material, it is also first calcined, if necessary, to reduce it to an oxid. The oxid of magnesium, or other suitable basic material, is then pulverized, and is then made into a plastic paste or mass, with or without the admixture of pulverized oxid of chromium, or other neutral material, as may be preferred, by mixing water, or other fluid therewith, and the plastic mass thus formed is filled into the containers, thus forming the cores 21. The walls of the containers are preferably each provided with a plurality of perforations as at 23, adapted to receive the core material and to hold the same securely in position. The perforations also permit the core material within the containers to contact with the core material between the containers to bind the containers securely together. The perforations, however, may be omitted. After these wall elements consisting of the containers 20 filled with the cores 21, have been thus completed, the side walls are constructed by piling the containers one upon another, or arranging them one against or in close proximity to another, somewhat as brick are arranged in a wall, and at the same time cementing or binding the containers together with some of the same plastic material with which they are filled, or other suitable material, the containers being preferably arranged transversely with respect to the walls and preferably having open inner ends in which the contents of the containers are exposed to form portions of the inner surface of the wall. But the inner ends of the containers may be closed by material of the same kind as the body of the container, which in the specific form mentioned is steel or iron. The outer ends of the containers are preferably exposed to the surrounding atmosphere and may be either open or closed.

While this improved wall construction is intended primarily for the exposed portions of the side walls of the furnace, it may be applied advantageously to other exposed portions of the interior of the furnace, for instance the walls of the air and gas ports 11 and 12, the walls of the conduits 14 and 15 leading from the air and gas regenerators 16 and 17 to the air and gas ports 11 and 12 respectively, and the end walls 4 of the hearth, may be made from the filled containers 20 in the manner similar to that just described for the side walls. Each of the doors 10 of the combustion chamber may be formed of a plurality of perforated containers 20 filled with suitable cores 21, as hereinbefore described, arranged to form a lining for a sheet iron or steel frame or box comprising a flat vertical plate 25 provided with an inwardly extending marginal flange 26, the containers being preferably held in abutment against the inner surface of the flat plate 25, by means of T-bolts 27, connected to the containers as at 28 and extending through the outer ends of the cores 21 of the containers and through the flat plate 25, to prevent warping, the outer ends of the bolts being provided with nuts 29. The containers 20 thus arranged to form each door 9 are cemented or bound together by the use of plastic material as hereinbefore described.

Instead of arranging the plastic basic material or the plastic mixture of the basic or neutral materials, in separate containers, as hereinbefore described, this plastic mass may be arranged effectively in pockets or compartments provided in any suitable unitary frame or other unitary structure to form an exposed wall of the furnace. For instance, each of the bridges or arches 13 between the air and gas ports 11 and 12 may be formed as shown in Figs. 4 and 5 of unitary sheet metal frame, comprising a curved comparatively thin plate 30 of iron or steel forming the upper surface of the arch, and inwardly projecting flat radial partitions or ribs 31 of the same metal extending longitudinally of the arch and secured to and carried by the curved plate 30, and forming therewith a plurality of pockets or compartments, or containers 32, which are filled with a plastic basic material, or basic and neutral material, as heretofore described. The partitions 31 are preferably each provided with a plurality of perforations 33 arranged to be filled by the plastic material and to hold or anchor the material in the compartments in place. It is evident that instead of the particular form of sheet metal frame illustrated in Figs. 4 and 5, any other suitable sheet metal frame providing a plurality of compartments or pockets, filled as hereinbefore described, might be used either to form an arched wall or to form a flat wall.

Instead of forming the containers of substantially cylindrical tubes as hereinbefore described, these containers may be made of iron or steel wire wound in spiral form to provide a substantially tubular structure 35. as shown in Fig. 8, or may be made of short sections of tubing 36, provided with annular corrugations 37, as shown in Fig. 9, these two latter forms being particularly adapted to hold the cores securely in position. It is evident that the containers need not be of any particular form but may be cylindrical, rectangular, hexagonal or octagonal, or of any other desirable form, and may be perforated, or corrugated, or provided with internal projections or bridges, or any other suitable means that may be found desirable for anchoring or binding the containers or their cores firmly in position. For instance, as shown in Fig. 10, a spiral wire 38 might be secured in each container to hold the cores in position. To prevent atmospheric oxidization the iron or metal containers may be galvanized.

The arched roof 5 of the furnace may be formed of a plurality of iron or steel containers, preferably perforated or corrugated, and filled and cemented or bound together by core material in a manner similar to that hereinbefore described for forming the side walls 6 and 7, or the roof 5 might be made of a combination of a steel or iron plate and filled containers secured thereto in a manner similar to that described for constructing the doors 10, or of a unitary metal frame providing a plurality of pockets, as for instance of a sheet of steel or iron provided with internal perforated ribs to form pockets and having the pockets filled with core material in a manner similar to that described for the construction of the arches 13 between the air and gas ports, or the roof 5 might be formed as heretofore of silica brick.

The hearth 1 may be provided as heretofore with a base 40 of magnesite brick and an inner lining 41 of several layers of calcined magnesite, or, if preferred, one of the improved forms of wall construction hereinbefore described might be substituted for the magnesite brick in forming the base of the hearth, for instance, the base 40 might be formed of a plurality of vertically arranged iron or steel containers filled and cemented together as hereinbefore described, or of a unitary iron or steel structure providing a plurality of upwardly opening pockets filled with suitable core material, as hereinbefore described.

In the operation of the furnace constructed in accordance with this invention, it is thought that the inner ends of the iron containers, which are exposed to the heat and chemical action of the combustion chamber, are changed into oxid of iron, and that gradually the containers are changed to a greater or less degree throughout their entire length into oxid of iron. This is thought to be due to the action of the heated contents of the furnace in combination with the consequent action of the basic material within the container upon the iron. The iron oxid thus formed is, of course, basic and will not attack the basic magnesium oxid or the mixture of basic material and neutral material, with which the containers may be filled. Furthermore, the solid mass with which the containers are filled is considered practically infusible under the highest temperature to which it is subjected in a furnace, or in other words, does not melt and therefore does not form any slag. This obviously is a distinct improvement over the silica brick which, when melted, forms as hereinbefore noted, an acid compound which will attack any basic lining such as is ordinarily used in the hearth of a furnace.

This invention is not limited in its application to any particular form of container, or to a container of any particular material, or to any particular material or materials for filling the containers, and furthermore the invention is not limited in its application to an open hearth steel furnace, or to a furnace of any particular form or construction, or to any particular part of a furnace, as it is evident that the invention may be applied in various forms to meet various requirements without departing from the spirit of the invention or the scope of the appended claims.

Having thus fully described this invention, I claim and desire to protect by Letters Patent of the United States:

1. A furnace comprising a plurality of metal containers, and basic material arranged in said containers.

2. A furnace comprising a wall including a plurality of iron containers, and basic material arranged in said containers.

3. In an open hearth steel furnace, the combination with a hearth, of walls forming therewith a combustion chamber, one of said walls including a plurality of iron containers, and basic material arranged in said containers.

4. A furnace including a wall comprising a plurality of iron containers, and a mixture of basic and neutral materials arranged in said containers.

5. In an open hearth steel furnace, the combination with a hearth, of walls forming therewith a combustion chamber, one of said walls comprising a plurality of iron containers, and a mixture of basic and neutral materials arranged in said containers.

6. An element for a wall construction comprising a metal container, and a mixture of basic and neutral materials arranged therein.

7. An element for a wall construction comprising an iron container, and material including magnesium oxid arranged therein.

8. An element for a wall construction comprising an iron container, and a mixture including magnesium and chromium oxids contained therein.

9. A furnace having a combustion chamber, and including a wall comprising metallic means providing a plurality of receptacles, and solid basic material arranged in said receptacles.

10. A furnace having a combustion chamber, and including a wall comprising means providing a plurality of iron receptacles, and material including basic and neutral substances arranged in said receptacles.

11. A furnace having a combustion chamber, and including a wall comprising a unitary metal structure providing a plurality of receptacles, and basic material arranged in said receptacles.

12. An open hearth steel furnace comprising a hearth, and walls extending upwardly from said hearth and arranged to form therewith a combustion chamber, said walls including a plurality of metal containers and basic material arranged in said containers.

13. An open hearth steel furnace comprising a hearth, and walls extending upwardly from said hearth and arranged to form therewith a combustion chamber, said walls including a plurality of metal containers, lining material within said containers and lining material arranged between said containers.

14. An open hearth steel furnace chamber comprising an upwardly extending wall including a plurality of elongated metal containers, arranged one above another, and lining material in said containers.

15. An open hearth steel furnace chamber including a plurality of substantially horizontal, elongated metal containers arranged one above another, and lining material in said containers.

16. As a structural unit in building up a furnace wall, a metal container and material including basic material filling said container and in contact therewith.

17. An open hearth steel furnace comprising a wall having an inner surface exposed to the chemical re-actions of the interior of the furnace, said wall being composed of a comparatively large number of metal containers.

18. An open hearth steel furnace comprising a wall having an inner surface exposed to the chemical reactions of the interior of the furnace, said wall being composed of a comparatively large number of tubular metal containers, each filled with lining material, said containers being arranged transversely with respect to said wall.

19. An open hearth steel furnace comprising a hearth and walls extending upwardly from said hearth and forming therewith a combustion chamber, one of said walls including a comparatively large number of tubular metal containers arranged one above another and extending transversely with respect to said wall, each of said containers being filled with lining material in contact therewith.

20. As a structural unit in building up a furnace wall, the combination with a metal container of solid non-acidic material contained therein.

21. As a structural unit in building up a furnace wall, an iron container and non-acidic material arranged therein.

22. As a structural unit in building up a furnace wall, a metal container and solid non-acidic material arranged therein.

23. A furnace comprising a wall including a plurality of metal containers and non-acidic material arranged in said containers.

24. A furnace comprising a wall including a plurality of metal containers and solid non-acidic material arranged in said containers.

In witness whereof I have hereunto set my hand this 6th day of May, A. D., 1913.

NORMAN E. MACCALLUM.

Witnesses:
ADDISON IRWIN GARDNER,
ALEXANDER PARK.